C. N. SOWDEN.
SPRING WHEEL.
APPLICATION FILED FEB. 26, 1913.
1,082,915.
Patented Dec. 30, 1913.
2 SHEETS—SHEET 1.
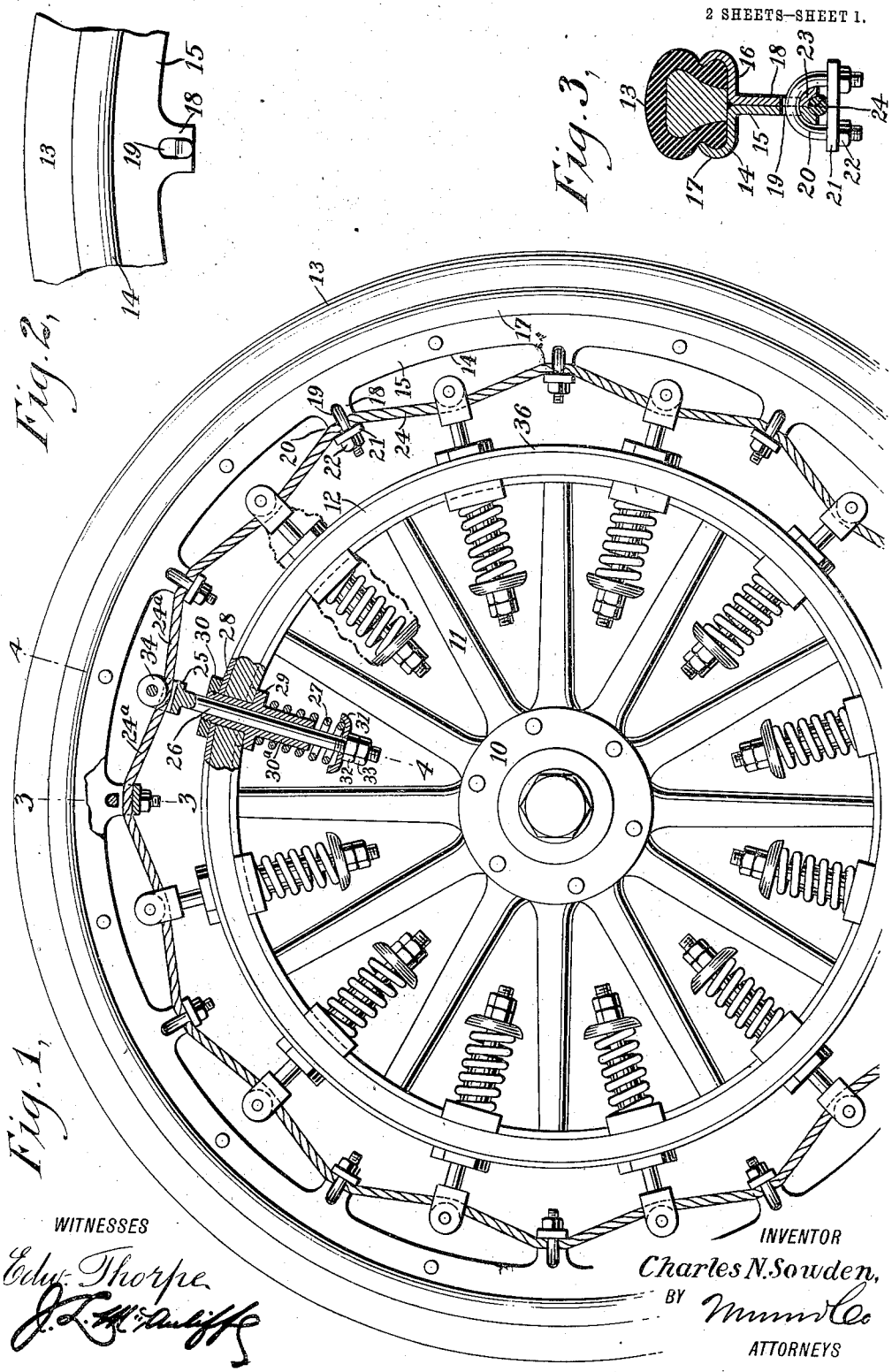
WITNESSES
Edw. Thorpe
INVENTOR
Charles N. Sowden,
BY
ATTORNEYS

C. N. SOWDEN.
SPRING WHEEL.
APPLICATION FILED FEB. 26, 1913.

1,082,915.

Patented Dec. 30, 1913.
2 SHEETS—SHEET 2.

WITNESSES
Edward Thorpe

Charles N. Sowden, INVENTOR

BY
ATTORNEYS

UNITED STATES PATENT OFFICE.

CHARLES N. SOWDEN, OF GUANTANAMO, CUBA.

SPRING-WHEEL.

1,082,915.  Specification of Letters Patent.  Patented Dec. 30, 1913.

Application filed February 26, 1913. Serial No. 750,795.

*To all whom it may concern:*

Be it known that I, CHARLES N. SOWDEN, a British subject, at present residing at Soledad, Guantanamo, in the Province of Santiago de Cuba, Republic of Cuba, have invented a new and Improved Spring-Wheel, of which the following is a full, clear, and exact description.

My invention relates to spring wheels more particularly designed for use on automobiles, and more especially to that class of spring wheels in which there is an inner hub and spoke section having a rim, and an outer tire rim.

It is an object of my invention to provide a novel spring means affording a cushioned connection between the inner rim and the tire rim.

It is also a design of my invention to improve in various particulars, devices of the general character indicated, to the end that efficiency in operation may be promoted, as well as durability, economy of manufacture, and simplicity of adjustment and repair.

The invention will be more particularly explained in the specific description hereinafter to be given.

Reference is to be had to the accompanying drawings forming a part of this specification, in which similar characters of reference indicate corresponding parts in all the views.

Figure 4:
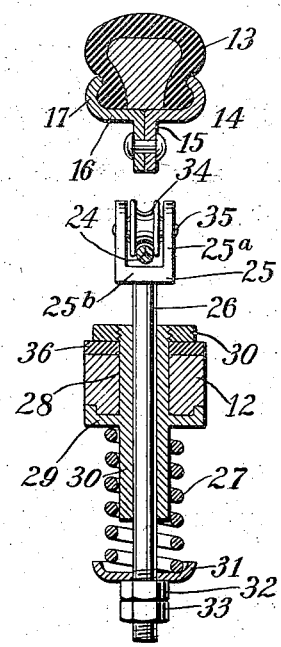
Figure 5:
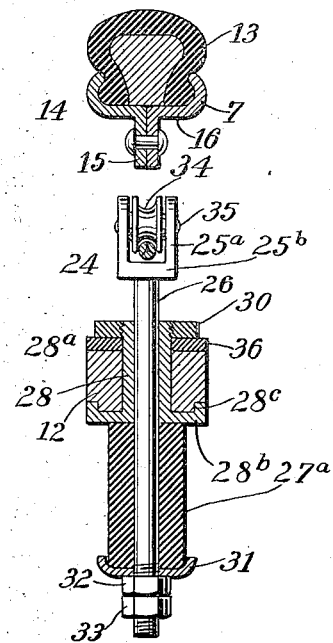

Figure 1 represents in side elevation, with parts broken away, a spring wheel embodying my invention; Fig. 2 shows a detail of the tire rim; Fig. 3 is a detail cross section approximately on a plane corresponding with the line 3—3 of Fig. 1; Fig. 4 is a detail cross section on a plane corresponding with the line 4—4 of Fig. 1; and Fig. 5 is a cross section similar to Fig. 4, but showing a slight modification in the character of the spring.

In constructing a wheel embodying my invention in accordance with the particular example illustrated, a hub and spoke section is formed, having the hub 10, spokes 11 and rim 12, said elements being of any approved construction in detail. A continuous tire rim 14 is suitably formed to receive any approved tire 13. In the form shown, the tire rim is made up of two annular mating sections 15, of corresponding shape, which when brought together constitute a peripheral seat portion 16, having any practical form of side flanges 17 to engage the tire 13.

From the inner sides or inner periphery of the tire rim 14, project rigid radial arms 18, formed with registering transverse openings 19 for receiving the shackle bolts 20 of clips, each clip comprising, in addition to the U-shaped shackle bolt 20, a shackle plate or strap 21 secured by nuts 22 on the threaded ends of the bolt. The holes 19 are produced by upsetting from the radial arms 18, tongues or lugs 23, said lugs being bent outwardly and curved in a downward direction to give each lug a sector shape, so that when the rim sections 15 are brought together the respective lugs 23 thereof will constitute a semicircular seat fitting the concave surface of the shackle bolt 20. Similarly the inner surfaces of the pair of lugs 23 present a concave recess in which is clamped a rope or equivalent flexible element 24, which preferably is a wire cable, the ends of which are spliced or otherwise properly united so that the cable extends in unbroken continuity around the wheel within the tire rim 14. The arrangement is such that the cable 24 is tightly clamped to each radial arm of the tire rim by the clips, while the stretches of the cable between each peripherally spaced clip will provide a flexible element.

Bearing against each flexible cable section, and engaging the same, is a head 25 formed on or secured to radially disposed spindles or stems 26, which are fitted in the inner rim 12 of the wheel, for radial movement. The stems 26 are under the influence of suitable springs to give the stems a yielding support and thus afford a spring support for the tire rim 14. The springs in the form shown in Figs. 1 to 4 are helical springs, 27, while in the form shown in Fig. 5, rubber springs or buffers 27ª are employed. Preferably, each stem 26 passes through a radial bushing 28, which has a flange 29 at the inner periphery of the inner rim 12, and receives a nut 30 on the outer threaded end of the bushing, whereby said bushing is firmly secured to the rim 12. The bushings extend inwardly radially beyond the shoulder 29, as at 30ª, to give a longer bearing for the stem 26. The outer ends of the springs 27 abut against the flange 29, while the inner end abuts against a cupped washer 31 on the inner end of the stem 26, said inner end being threaded and receiving a nut 32 and preferably, also, a lock nut 33.

In the form shown in Fig. 5, the bushing 28$^a$ terminates at its inner end in a lateral head 28$^b$, which is returned at the sides to provide edge flanges 28$^c$. The buffer spring 27$^a$ is seated at its outer end against the head 28$^b$ and at its inner end against the cupped washer 31, as in the form shown in Fig. 4. A nut 30$^a$ takes onto the outer threaded end of the bushing 28$^a$.

It is to be understood that the intermediate cable sections between the shackles constitute flexible seats engaged by the heads 25 of the radial, spring-acted stems 26, and that the said cable sections are taut. Preferably, the heads 25 are provided with peripherally grooved rollers 34, mounted to revolve on pins 35 extending between forks 25$^a$ on the heads 25, so that the cable 24 passes between the inner side of the peripherally grooved rollers 34 and the opposed surface of the base 25$^b$ of each head 25. It will thus be seen that the hub and spoke section with its rim 12 and spring-pressed stems 26, is yieldingly suspended from the tire rim by the cable sections, which latter constitute yielding suspension elements disposed peripherally around the tire rim. The nuts on the stems are employed to compress the springs sufficiently to prevent either of the radially opposed springs from becoming entirely slack even with an extreme movement of the hub and spoke section relatively to the tire rim.

It is to be understood that in practice the inner tire rim 12 is provided with an exterior metallic tire or band 36 which is shrunk onto the rim 12, which latter constitutes the felly, the said band 36 serving to resist the stress of the springs and the shock of action when in use. The torsion due to the hub and spoke section being driven or braked, is taken up by the rollers 34 running up the angles 24$^a$ (Fig. 1) which are presented by the cable sections when the springs are under tension, and by the hub and spoke section turning within the tire rim the angles 24$^a$ are increased, due to the increased bend in the cable caused by a change in position of the roller. The side swaying of the car having my improved wheel is taken care of by the tautness of the cable.

Having thus described my invention, I claim as new and desire to secure by Letters Patent:

1. A spring wheel, comprising an inner wheel section; a tire section; an endless cable disposed in the tire section; radial arms on the tire section at intervals therearound and formed with transverse openings; clips immovably securing the cable to each arm to form individual cable sections between said arms, said clips consisting of shackle bolts passing through the mentioned arms, strap plates fitting on the bolt and clamping the cable against the arms, and nuts on the bolt; radial spring-pressed stems carried by the inner wheel section alternating with the arms on the rim sections, the outer ends of the stems having forks through which the cable sections extend; and rollers carried by the forks and riding on the cable sections.

2. A spring wheel, comprising an inner wheel section, an outer tire section, a cable running around the inner periphery of the tire section, radially movable, spring-pressed stems on the inner section having members for embracing the cable, and means for fastening the cable at points alternating with the stems, said means consisting of elements on the tire section having transverse holes, concave lugs on the tire section at the inner sides of the holes, presenting concavo-convex surfaces, shackle-bolts passing through said holes and bearing on the convex surfaces of the lugs, strap plates on the shackle bolt, between which plates and the lugs the cable is received, and nuts for binding the strap plates against the cable to clamp the same tightly against the concave surfaces of the lugs.

In testimony whereof I have signed my name to this specification in the presence of two subscribing witnesses.

CHARLES N. SOWDEN.

Witnesses:
  H. C. MORGAN,
  C. F. FERRER.